United States Patent [19]

Saito et al.

[11] 3,798,385

[45] Mar. 19, 1974

[54] MAGNETIC RECORDING AND REPRODUCING DEVICE WITH SPEAKER CUT OFF WHEN DRIVING SYSTEM IS STOPPED

[75] Inventors: Kazunori Saito; Toshio Tsubaki; Shoichi Ito; Sadaaki Fujiyama, all of Hitachi, Japan

[73] Assignee: Hitachi, Ltd., Tokyo, Japan

[22] Filed: Oct. 22, 1971

[21] Appl. No.: 191,591

[30] Foreign Application Priority Data

Nov. 9, 1970 Japan .............................. 45-97872
Nov. 9, 1970 Japan .............................. 45-97897

[52] U.S. Cl.... 179/100.2 S, 179/100.2 MD, 353/15
[51] Int. Cl.. G11b 23/30, G11b 27/30, G11b 31/00
[58] Field of Search ........... 179/100.2 S, 100.2 MD, 179/100.1 A, 100.2 TC, 100.2 C; 35/35 C; 353/15

[56] References Cited

UNITED STATES PATENTS

| | | | |
|---|---|---|---|
| 3,282,155 | 11/1966 | Cleary, Jr. et al. | 353/15 |
| 3,637,950 | 1/1972 | Halley | 179/100.2 S |
| 3,620,609 | 11/1971 | John, Jr. | 353/15 |
| 3,041,415 | 6/1962 | Gratian | 179/100.2 S |
| 3,420,966 | 1/1969 | Wright | 179/100.2 S |
| 2,975,672 | 3/1961 | Shields | 35/35 C |
| 3,622,229 | 11/1971 | John, Jr. | 179/100.2 S |
| 3,200,206 | 8/1965 | Johnson | 353/15 |

*Primary Examiner*—Daryl W. Cook
*Assistant Examiner*—Alfred H. Eddleman
*Attorney, Agent, or Firm*—Craig and Antonelli

[57] ABSTRACT

A magnetic recording and reproducing device used primarily with an educational slide projector with a built-in tape recorder, wherein an erroneous operation of a synchronizing system and generation of a discordant sound caused by continued feed of magnetic tape due to the inertia of a driving system including a motor is prevented when releasing the magnetic tape driving elements by a stop signal picked out to temporarily stop the reproduction of a sound recorded on the magnetic tape.

3 Claims, 6 Drawing Figures

INVENTORS
KAZUNORI SAITO,
TOSHIO TSUBAKI,
SHOICHI ITO AND
SADAAKI FUJIYAMA
BY Craig, Antonelli & Hill
ATTORNEYS INVENTORS
KAZUNORI SAITO,
TOSHIO TSUBAKI,
SHOICHI ITO AND
SADAAKI FUJIYAMA
BY Craig, Antonelli & Hill
ATTORNEYS INVENTORS
KAZUNORI SAITO,
TOSHIO TSUBAKI,
SHOICHI ITO AND
SADAAKI FUJIYAMA
BY Craig, Antonelli & Hill
ATTORNEYS

MAGNETIC RECORDING AND REPRODUCING DEVICE WITH SPEAKER CUT OFF WHEN DRIVING SYSTEM IS STOPPED

BACKGROUND OF THE INVENTION

1. Field of the Invention

This invention relates to a magnetic recording and reproducing device which is used primarily with a slide projector for class use.

2. Description of the Prior Art

A magnetic recording and reproducing device of this kind generally requires reproduction of an audio signal, a synchronizing signal for achieving synchronism with the screen of the slide projector and a stop signal for temporarily stopping a sound. The synchronizing signal has a different frequency from the stop signal, both of which are recorded in advance on the signal tracks of the magnetic tape. They are picked up by a common magnetic head and, after being amplified, separated by a frequency divider. The synchronizing signal actuates a synchronizing system only, while the stop signal releases a magnetic tape drive power circuit to temporarily stop reproduction of sound.

When temporarily stopping the sound with a reproduced stop signal, a switch for controlling the magnetic tape drive system is temporarily released to stop its operation. Due to the considerable inertia held in the driving system, it usually takes several hundred milliseconds to one second to stop it completely, and therefore a sound which has a frequency considerably lower than the ordinary voice is reproduced, causing a very discordant voice.

Assuming that the frequency of the synchronizing signal is $\omega 1$ and that of the stop signal $\omega 2$, the relation $\omega 1 < \omega 2$ is maintained. The time delay of several hundred milliseconds to 1 second before the complete stoppage of the magnetic tape causes the magnetic head to continue the reproducing operation during that time. When the frequency of the stop signal is reduced to the level of the synchronizing signal $\omega 1$, the synchronizing system operates erroneously to advance the slide by one frame in spite of the stop signal applied to it, causing a disagreement between an image projected on the screen and the narrative voice.

Also, the frequency divider circuit for separating the synchronizing signal and stop signal from each other consists of independent LC resonant circuits for both signals, which causes different gains for each circuit. Further, independent circuits are used for detection of each signal, resulting in the reed for a multiplicity of component parts including transistors, which contributes to a high cost device.

SUMMARY OF THE INVENTION

An object of the invention is to provide a recording and reproducing device wherein an amplifier for a speaker is grounded at the same time that the drive system is released with a reproduced stop signal, so that no discordant voice is produced from the speaker even though the magnetic tape feed continues due to the inertia of the drive system.

Another object of the invention is to prevent the slide from being advanced by preventing energization of the synchronizing system, even when the speed of magnetic tape is reduced and the stop signal $\omega 2$ comes near or equal to the synchronizing signal $\omega 1$ in frequency.

Still another object of the invention is to provide a highly reliable frequency divider circuit with a small number of component elements for separating the synchronizing signal and stop signal from each other.

DESCRIPTION OF THE PREFERRED EMBODIMENTS

An actual example of the magnetic recording and reproducing device according to the invention as it is applied to a slide projector will be explained below with reference to the accompanying drawings.

Figure 1:
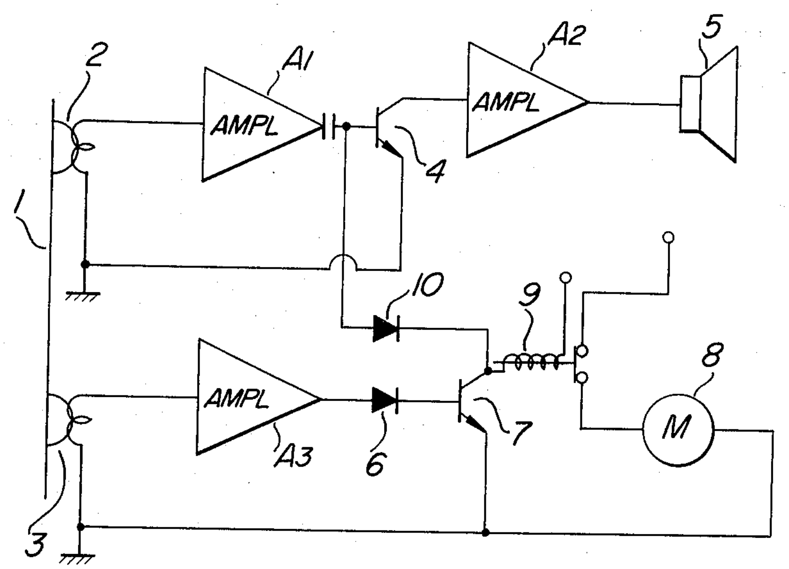
FIG. 1 is a diagram showing an embodiment of the invention.
Figure 2:
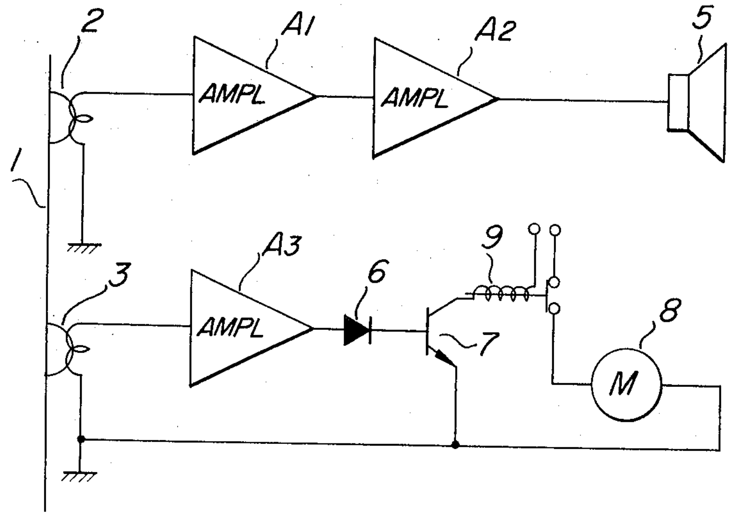
FIG. 2 is a diagram showing a conventional magnetic recording and reproducing circuit.

Referring to FIGS. 1 and 2, the reference numeral 1 shows magnetic tape, and numerals 2 and 3 magnetic heads. The output of the magnetic head 2 is connected with amplifier A1, the output of which is in turn connected with the base of a transistor 4. A2 shows another amplifier connected with the collector of transistor 4, and the output terminal of the amplifier A2 is connected with the speaker 5. The emitter of transistor 4 is grounded. The magnetic head 3 which is used particularly for signal reproduction is connected with the amplifier A3 and diode 6 at its output side. The diode 6 is connected with the base of the transistor 7, the collector of which is connected with a relay 9 which functions to energize and de-energize the drive element 8 of the magnetic tape 1. The diode 10 is inserted between the collector of transistor 7 and the base of the transistor 4.

The operation of the device with the above-described construction according to the invention will be now explained. When a stop signal recorded on the magnetic tape 1 is picked up by the magnetic head 3, the transistor 7 is made to conduct through the amplifier A3 and diode 6, thereby energizing the relay 9 associated with the drive element 8, for example a motor. The drive element 8 is thus stopped, maintaining the cut-off state of voice, but due to the inertia of the magnetic tape 1 and drive element 8, it takes about several hundred milliseconds to 1 second before they come to a complete stop. A discordant sound with a frequency considerably lower than that of an ordinary voice which otherwise might develop from the speaker 5 if the ordinary voice reproducing circuit including the transistor 4 is maintained conductive during this delay time is prevented from occurring since the presence of the diode 10 causes the base of the transistor 4 to be grounded the instant the transistor 7 begins to conduct, cutting off the transistor 4. This compares with the prior art device as shown in FIG. 2 in which even if a stop signal causes the transistor 7 to conduct, de-energizing the drive element 8, the ordinary voice reproduction circuit is not cut off immediately, producing a discordant voice as described earlier. In FIG. 2, like numerals show like component elements in FIG. 1, the diode 6 being used for preventing a reverse current while the transistor 7 is cut off.

As will be seen from the above description, the invention provides a magnetic recording and reproducing device with a very simple construction for eliminating a discordant sound of a very low frequency which might develop at the time of stopping the magnetic tape.

Figure 3:
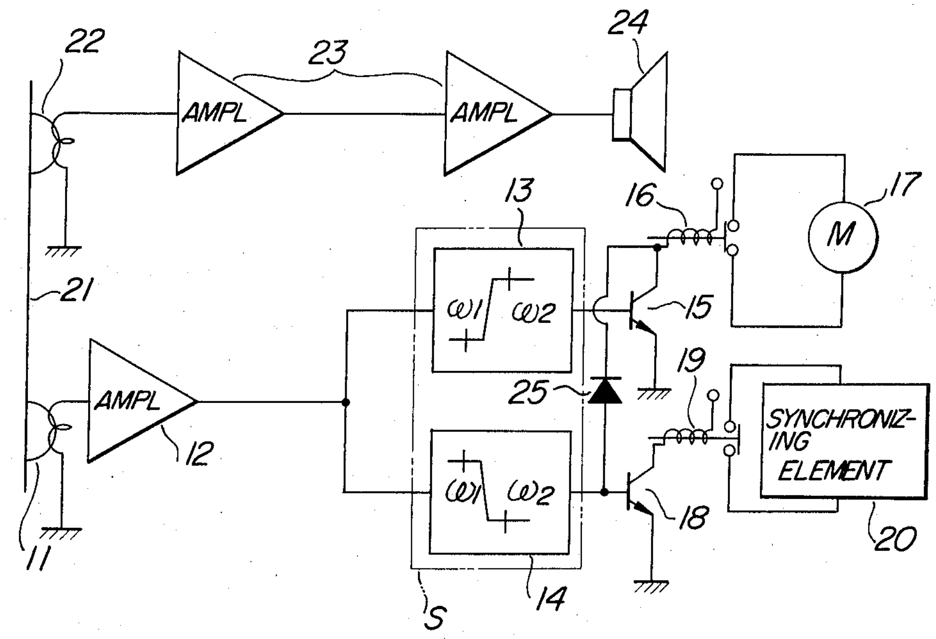
FIG. 3 is a diagram showing another embodiment of the invention.
Figure 4:
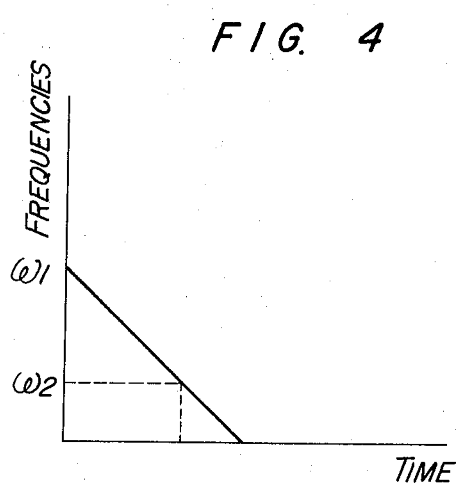
FIG. 4 is a diagram showing the relationship between frequency and time for magnetic reproduction.

Referring now to FIGS. 3 and 4, the reference numeral 11 shows a magnetic head, the output of which is amplified by the amplifier 12. The output of the amplifier 12 is applied to the frequency divider circuit S for separating applied signals into high and low frequencies. The frequency divider circuit S consists of a high-pass filter 13 and a low-pass filter 14. The output of the high-pass filter 13 is applied to the base of the transistor 15, the collector of which is connected with the power relay 16 which in turn constitutes a switch associated with the drive element 17 for feeding the tape. Numeral 18 shows a transistor with its base connected to the output terminal of the low-pass filter 14 and with its collector connected with a synchronizing relay 19 which constitutes a switch associated with the synchronizing element 20 for synchronizing a voice with, an image projected on the screen. The reference numeral 21 shows magnetic tape which is brought into contact with in addition to the magnetic head 11, the magnetic head 22 for reproducing an ordinary voice, the output terminal of which is connected with the amplifier 23 and the speaker 24. The diode 25 is inserted between the collector of the transistor 15 and the base of the transistor 18.

When a signal $\omega 2$ of a high frequency for stopping the voice temporarily is picked up by the magnetic head 11, it is amplified by the amplifier 12 and, through the high-pass filter 13, is applied to energize the transistor 15. As a result, the power relay 16 is cut off and the drive element stops its operation. On the other hand, simultaneously with the conduction of the transistor 15, the presence of the diode 25 causes the base of the transistor 18 to be brought down to the same potential as the ground, which, in combination with the fact that the emitter of the transistor 18 is grounded, keeps the transistor 18 in a cut-off state.

In this way, even when with the decrease in the speed of the magnetic tape 21 the frequencies of the stop signal $\omega 2$ and the synchronizing signal $\omega 1$ come near or equal to each other, the transistor 18 continues in a cut-off state and therefore the synchronizing element 20 is not energized thereby to avoid the case in which the slide is advanced by a frame erroneously.

It will be understood from the above description that the invention provides a device with a very simple circuit arrangement capable of maintaining the image projected on the screen and the narrative voice in synchronism with each other.

Figure 5:
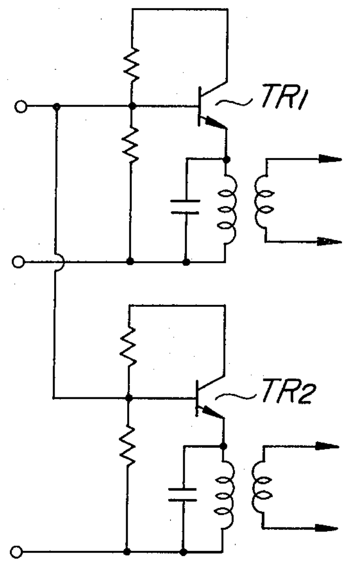
FIG. 5 shows a prior art frequency divider circuit.
Figure 6:
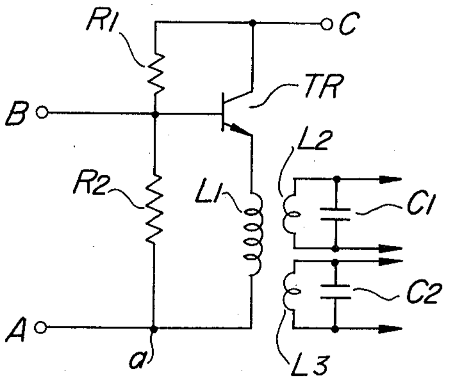
FIG. 6 is a diagram showing a frequency divider circuit according to another embodiment of the invention.

Finally, referring to FIGS. 5 and 6, A, B and C show terminals, TR a control transistor, and R1 a resistor inserted between the collector and the base of the control transistor TR. Between the emitter and the base of the transistor TR, there are inserted the primary winding L1 of a control winding in series with the resistor R2. The junction point *a* between the control winding L1 and the resistor R2 is connected with he terminal A. The secondary winding L2 and capacitor Cl constitutes a first parallel LC resonance circuit, which is so arranged as to reach a resonant state in response to a synchronizing signal of, say, 50Hz applied through the magnetic head from the magnetic tape on which it is recorded. Also, the tertiary winding L3 and capacitor C2 constitute a second parallel LC resonance circuit, whose component elements are so arranged as to achieve resonance in response to a motor stop signal of, say, 1,000 Hz applied through the magnetic head from the magnetic tape. Both the secondary winding L2 and the tertiary winding L3 are magnetically coupled to the primary winding L1. The terminals B and C are connected to the base and the collector of transistor TR respectively.

It will be seen from the above description that when either a synchronizing signal or a stop signal is picked up from a common magnetic tape by a magnetic head, one of the resonance circuits resonates so as to accomplish the required control of the slide projector. The transistor TR which is common to both the resonance circuits shows the same gain of operation for any of the resonance circuits, resulting in a stable frequency divider circuit. Further, common component elements may be used for both of the resonance circuits, thereby reducing the number of the component elements.

Accordingly, the invention provides a very economical device with a stable operation which eliminates the need of the independent transistors TR1 and TR2 and resistors associated with them as shown in a conventional resonance circuit of FIG. 5.

We claim:

1. A magnetic recording the reproducing device comprising a magnetic tape on which audio signals and stop signals for temporarily stopping tape feed are recorded, a first magnetic head placed opposite to said magnetic tape for picking up the audio signals from the tape and providing an audio signal output at an output terminal thereof, a first transistor with its base connected with the output terminal of said first magnetic head for conducting in response to the audio signals and taking out the audio signals by the collector of said first transistor, a speaker connected to the collector of said first transistor for converting the passed audio signals to voice output, a second magnetic head placed opposite to said magnetic tape for picking up the stop signals from the tape and providing a stop signal output at an output terminal thereof, a second transistor with its base connected to the output terminal of said second magnetic head for conducting in response to the stop signals and taking out the stop signals by the collector of said second transistor, a relay which is connected to the collector of said second transistor for energizing and de-energizing a drive element of said magnetic tape, said relay de-energizing the drive element when said second transistor is in a conducting state, and a diode inserted between the base of said first transistor and the collector of said second transistor for causing said first transistor to be nonconductive when said second transistor is conductive.

2. A magnetic recording and reproducing device comprising a magnetic tape on which audio signals and stop signals for temporarily stopping tape feed are recorded, a first magnetic head placed opposite to said magnetic tape for picking up the audio signals recorded on said magnetic tape, a first amplifier connected to the output terminal of said first magnetic head for amplifying said picked-up audio signals, a first transistor with its base connected to the output terminal of said first amplifier which conducts in response to said audio signals and takes out said audio signals by the collector of said first transistor, a second amplifier connected to the collector of said first transistor for further amplifying said passed audio signals, a speaker connected to the output terminal of said second amplifier for converting said audio signals to a voice output, a second magnetic head placed opposite to said magnetic tape for picking up the stop signals recorded on said magnetic tape, a third amplifier connected to the output terminal of said second magnetic head for amplifying the picked-up stop signal, a second transistor with its base connected to the output terminal of said third amplifier which conducts in response to said stop signal and takes out said stop signal by the collector of said second transistor, a relay connected to the collector of said second transistor for energizing and de-energizing a drive element of a driving system of said magnetic tape, said relay de-energizing the drive element when said second transistor is in a conductive state, and a diode inserted between the base of said first transistor and the collector of said second transistor to make said first transistor cut-off by grounding the base of said first transistor through said diode during the conduction of said second transistor, thereby preventing said speaker from producing a discordant voice output which frequency is lower than ordinary audio signals when said driving system is stopped.

3. A magnetic recording and reproducing device comprising a magnetic tape on which audio and first and second control signals are recorded, means for picking up said control signals from the tape and for supplying said control signals to a frequency divider circuit, said frequency divider circuit including a control transistor for conducting in response to said control signals, a first resistor inserted between the collector and base of said control transistor, control windings having primary, secondary and tertiary windings, a second resistor inserted between said primary winding and the base of said control transistor, a first capacitor connected in parallel with said secondary winding, a second capacitor connected in parallel with said tertiary winding, a first terminal led from the collector of said control transistor, a second terminal led from the base of said control transistor and a third terminal led from a junction point between said primary winding and said second resistor, said primary winding being connected to the emitter of said transistor, said secondary and tertiary windings being magnetically connected with said primary winding whereby the parallel arrangement of said secondary winding and said first capacitor provides an output in accordance with the first control signal and the parallel arrangement of said tertiary winding and said second capacitor provides an output in accordance with the second control signal.

* * * * *